(12) United States Patent
Nemirovsky et al.

(10) Patent No.: US 11,550,070 B2
(45) Date of Patent: Jan. 10, 2023

(54) DIFFERENTIAL MODE DETECTION CIRCUIT

(71) Applicant: Technion Research and Development Foundation Ltd., Haifa (IL)

(72) Inventors: Yael Nemirovsky, Haifa (IL); Sharon Bar-Lev Shefi, Nofit (IL); Igor Brouk, Haifa (IL)

(73) Assignee: Technion Research and Development Foundation Ltd., Haifa (IL)

( * ) Notice: Subject to any disclaimer, the term of this patent is extended or adjusted under 35 U.S.C. 154(b) by 26 days.

(21) Appl. No.: 17/305,309

(22) Filed: Jul. 2, 2021

(65) Prior Publication Data

US 2022/0003885 A1 Jan. 6, 2022

Related U.S. Application Data

(60) Provisional application No. 62/705,541, filed on Jul. 2, 2020.

(51) Int. Cl.
*G01T 1/24* (2006.01)

(52) U.S. Cl.
CPC ..................................... *G01T 1/24* (2013.01)

(58) Field of Classification Search
CPC ........................................................ G01T 1/24
See application file for complete search history.

(56) References Cited

U.S. PATENT DOCUMENTS 5,793,230 A * 8/1998 Chu .................... G01N 27/4148
327/307

* cited by examiner

*Primary Examiner* — Hugh Maupin
(74) *Attorney, Agent, or Firm* — Reches Patents

(57) ABSTRACT

There may be provided a radiation sensing device that includes a first TMOS with temperature dependent electrical parameters; wherein the first TMOS is exposed to radiation, and a second TMOS transistor that is sheltered from radiation. The radiation sensing device performs a differential measurement, and applied various measures for noise reduction, and maintaining the stability of the radiation sensing device.

20 Claims, 5 Drawing Sheets

Small-signal equivalent circuit.

DIFFERENTIAL MODE DETECTION CIRCUIT

CROSS REFERENCE

This application claims priority from U.S. provisional patent 62/705,541 filing date Jul. 2, 2020.

BACKGROUND

A new generation of low-cost uncooled passive thermal sensors based on a suspended transistor fabricated in standard CMOS-SOI process and released by dry etching, has been developed. It is currently under development for commercial exploitation. The uncooled IR sensing is based on a floating in vacuum thermal transistor MOS (dubbed TMOS), which is thermally isolated by nanomachining, converting small temperature changes to electrical signal via the transistor I-V characteristics. The silicon-based technology is implemented in CMOS-SOI technology and Wafer Level Processing in standard CMOS Fab. Furthermore, the silicon technology at a standard CMOS FAB enables Smart Wafer Level Packaging (with vacuum, integrated optical window and filters and Wafer Level Optics) at a considerable and exceptional cost reduction.

The TMOS may be operated either as a two terminal device (diode-like connection, referred below as 2T TMOS or as a three terminal device (3T TMOS).

The three terminal device requires three interconnects: to the drain, to the source which is shortened to the bulk and to the gate. The advantage of the three terminal TMOS is the "internal" voltage gain of the transistor, due to the higher output resistivity rds.

The electrical interconnects, residing on the holding arm, are made of implanted active-Si and poly-silicon (both with a thin layer of silicide). The length of the holding arm and the choice of CMOS layers for interconnects are dictated by the need to reduce thermal conductance ($Gth \leq 10^{-7}$ W/K). The length of the holding arm, the number of squares and the ohms per square of the active silicon and the poly-silicon, determine the value of interconnect resistances, that form parasitic resistors denoted by RS and RD, with typical values of RS+RD~4kΩ.

Interconnects to the readout circuitry are made of the process metallization layers. Because of the good thermal conductance of metal interconnects on the frame, which are connected to the readout circuitry, the frame may be considered as heat sink.

Various detectors use a bridge-like circuit that includes an active sensor that "sees" the scene and a "blind" sensor that is masked. This configuration may be beneficial as a TMOS sensor produces detection signals that are by several orders of magnitude smaller than the DC signal, as well as the cancelation of the self heating effect.

SUMMARY

There may be provided a radiation sensing device that may include (a) a first thermally isolated metal oxide semiconductor (TMOS) transistor with temperature dependent electrical parameters; wherein the first TMOS may be exposed to radiation; (b) a second TMOS transistor that may be sheltered from radiation; (c) a current source that may be coupled to a drain of the first TMOS and to a drain of the second TMOS; (d) a voltage gate terminal that may be coupled, via an intermediate node, to a gate of the first TMOS and to a gate of the second TMOS; (e) two right-half-plane (RHP) zero cancelling branches coupled to the intermediate node; (f) a first active load that may be coupled to a drain of the first TMOS; (g) a second active load that may be coupled to a drain of the second TMOS; (h) an instrumental amplifier (IA) having an IA inverting input, an IA non-inverting input, an IA output and an IA average voltage port; wherein the IA inverting input may be coupled to the drain of the first TMOS; wherein the IA non-inverting input may be coupled to the drain of the second TMOS; and (i) a common mode feedback amplifier (CMFA) may include a CMFA inverting input, a CMFA non-inverting input and a CMFA output; wherein the CMFA inverting input may be fed by a reference voltage; wherein the CMFA non-inverting input may be coupled to the IA average voltage port.

The two RHP zero cancelling branches may include a first branch that may include a first resistor and a first capacitor that are serially connected to each other; wherein the first capacitor may be also coupled to the intermediate node; wherein the first resistor may be also coupled to the drain of the second TMOS.

The two RHP zero cancelling branches may include a second branch that may include a second resistor and a second capacitor that are serially connected to each other; wherein the second capacitor may be also coupled to the intermediate node; wherein the second resistor may be also coupled to the drain of the second TMOS.

The first load may be a first metal-oxide-semiconductor field-effect transistor (MOSFET) transistor that has a drain that may be coupled to the drain of the first TMOS.

The second load may be a second MOSFET transistor that has a drain that may be coupled to the drain of the second TMOS; and wherein a gate of the first MOSFET transistor may be coupled to a gate of the second MOSFET transistor.

The second load may be a second MOSFET transistor that has a drain that may be coupled to the drain of the second TMOS; wherein a gate of the first MOSFET transistor may be coupled to the intermediate node via a first adjustable resistor.

The a gate of the first MOSFET transistor may be coupled to the intermediate node via a second adjustable resistor.

The current source may be a current mirror.

The first TMOS and the second TMOS are configured to operate at a sub-threshold during a sensing period.

There may be provided a method for sensing radiation by a radiation sensor, the method may include: (a) sensing radiation by a first thermally isolated metal oxide semiconductor (TMOS) transistor with temperature dependent electrical parameters; wherein the first TMOS belongs to the radiation sensor; wherein the radiation sensor also includes a second TMOS transistor that is sheltered from radiation; a current source that is coupled to a source of the first TMOS and to a source of the second TMOS; a voltage gate terminal that is coupled to a gate of the first TMOS and to a gate of the second TMOS; two right-half-plane (RHP) zero cancelling branches coupled to the intermediate node; a first active load that is coupled to a drain of the first TMOS; a second active load that is coupled to a drain of the second TMOS; an instrumental amplifier (IA) having an IA inverting input, an IA non-inverting input, an IA output and an IA average voltage port; wherein the IA inverting input is coupled to the drain of the first TMOS; wherein the IA non-inverting input is coupled to the drain of the second TMOS; and a common mode feedback amplifier (CMFA) comprising a CMFA inverting input, a CMFA non-inverting input and a CMFA output; wherein the CMFA inverting input is fed by a reference voltage; wherein the CMFA non-inverting input is coupled to the IA average voltage port; (b) generating first TMOS detection signals by the first TMOS; (c) generating second TMOS detection signals by the second TMOS; (d) receiving, by the IA inverting input, the first TMOS detection signals; (e) receiving, by the IA non-inverting input, the second TMOS detection signals; and (f) generating an IA output signal and outputting the IA output signal; and (g) performing RHP zero cancelling by the two right-half-plane zero cancelling branches: performing one out of supplying current and draining current by the current source; feeding the CMFA inverting input is fed by a reference voltage; actively loading the first TMOS by the first active load; and actively loading the second TMOS by the second active load.

The two RHP zero cancelling branches may include a first branch that may include a first resistor and a first capacitor that are serially connected to each other; wherein the first capacitor may be also coupled to the intermediate node; wherein the first resistor may be also coupled to the drain of the second TMOS.

The two RHP zero cancelling branches may include a second branch that may include a second resistor and a second capacitor that are serially connected to each other; wherein the second capacitor may be also coupled to the intermediate node; wherein the second resistor may be also coupled to the drain of the second TMOS.

The first load may be a first metal-oxide-semiconductor field-effect transistor (MOSFET) transistor that has a drain that may be coupled to the drain of the first TMOS.

The second load may be a second MOSFET transistor that has a drain that may be coupled to the drain of the second TMOS; and wherein a gate of the first MOSFET transistor may be coupled to a gate of the second MOSFET transistor.

The second load may be a second MOSFET transistor that has a drain that may be coupled to the drain of the second TMOS; wherein a gate of the first MOSFET transistor may be coupled to the intermediate node via a first adjustable resistor.

The a gate of the first MOSFET transistor may be coupled to the intermediate node via a second adjustable resistor.

The current source may be a current mirror.

The first TMOS and the second TMOS are configured to operate at a sub-threshold during a sensing period.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
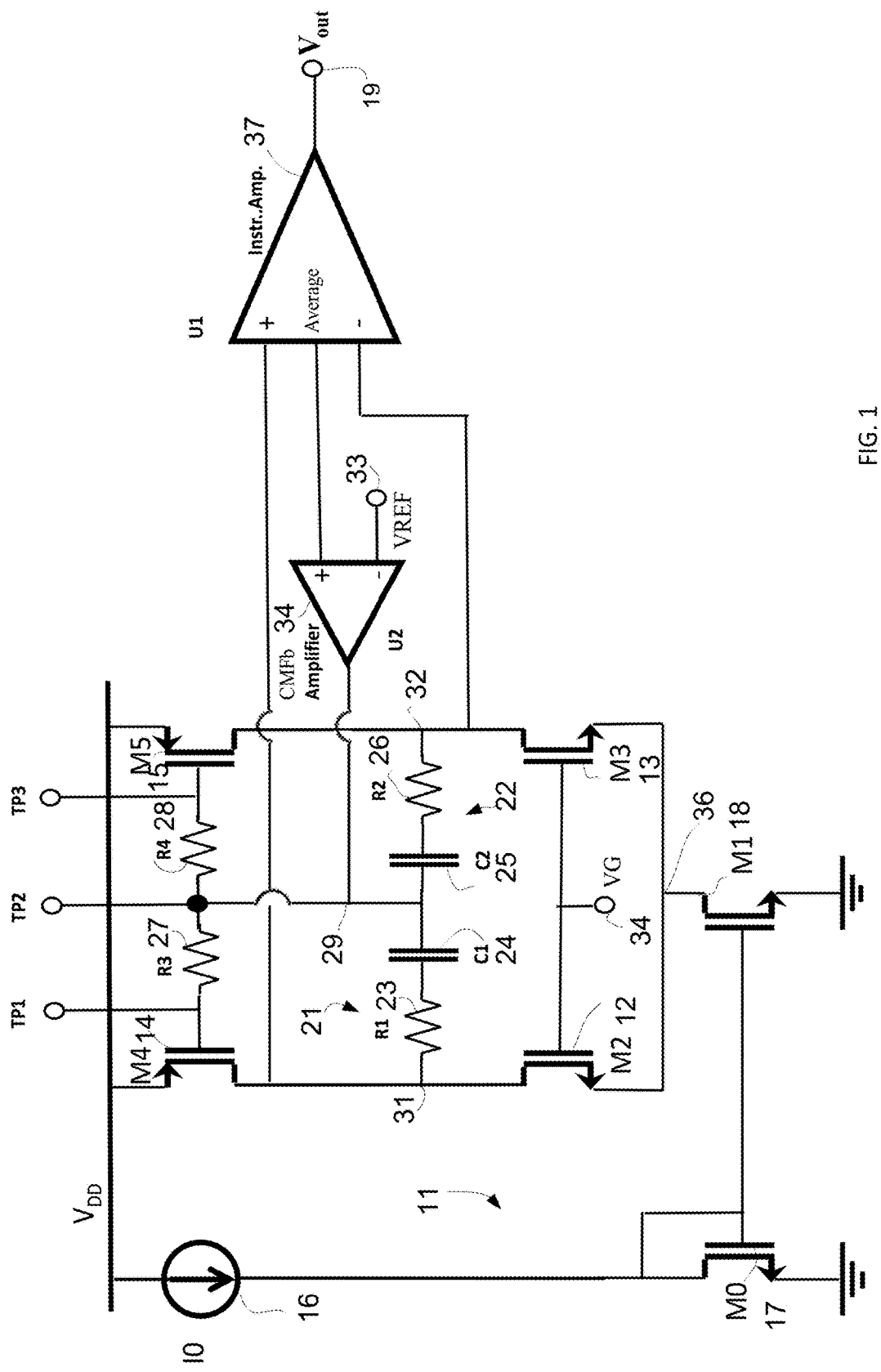
FIG. 1 is an example of full version of a detection circuit.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to a system should be applied mutatis mutandis to a method that can be executed by the system.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

FIG. 1 illustrates a detection circuit 10.

The first stage of this detection circuit includes a MOSFETs differential pair—first and second TMOS transistors, that may include first and second input N-type transistors (M2, M3) 12 and 13 respectively and active loads, which are implemented by first and second P-type MOSFET transistors M4, M5 14 and 15 respectively. Transistors M2-M5 are biased by the DC current mirror 11 implemented by transistors M0 and M1 17 and 18 respectively and current supply 16. This current mirror, which is common for two sides of the differential pair, is needed in order to solve the problem of common mode input voltage (as regular way for most of differential amplifiers). As a result, the node 36, which two sources of input transistors M2 and M3 are connected to, is getting to be floating, providing the degree of freedom for DC gate voltage of the input transistors.

Gates of input transistors are connected to the voltage supply through node "$V_G$" 34.

As distinct from the "classic" differential pair, the TMOS sensors are used as the input transistors (M2-M3), allowing to use of their AC "internal gain" thus exploiting the "sensor stage" as the first stage of the differential amplifier.

The active loads are intended to present a high small-signal impedance yet not requiring a large DC voltage drop, as would occur if a large resistor were used instead. Such a large AC load impedance is used in order to get the maximum AC gain of the differential pair.

The fully differential output of the sensors stage is connected to the fully differential input of instrumentation amplifier (U1) 37 for the further amplification.

Taking into consideration the high gain of the sensor stage, the DC operating point at its output has to be "stabilized" by means of "Common Mode Feedback" (CMFb), based on the CMFb Amplifier (U2) 34, as well as the Instrumentation amplifier (U1) 37, creating the Common-Mode signal. CMFb is closed through gates of active loads (M4-M5). As a result of using of CMFb, the average DC voltage between drains of both sensors has to be defined by voltage "VREF", applied at the negative input of CMFb Amplifier (U2) 34.

In order to provide the positive phase margin of CMFb, the "nulling resistor" technique has been used in the form of a first branch 21 and a second branch 22. The first branch includes a sequence of first resistor R1 23 and first capacitor C1 24. The second branch includes a sequence of second resistor R2 26 and second capacitor C2 25.

In order to fix the probable mismatch between two sides of the differential pair, two techniques are used. The first one is based on additional "degeneration" resistors R3 27 and R4 28, allowing to perform the fine tuning. Varying the resistances of R3 and R4 (manually or by other way), the gate-source voltages of the sensors (transistors M2-M3) can be slightly changed, leading to the mismatch correction. The second technique, allowing to perform the coarse tuning, is based on varying current sources $I_1$ and $I_2$ controlled by digital-to-analog converters (DAC).

The current source 11 is coupled to a drain of the first TMOS 12 and to a drain of the second TMOS 13. A voltage gate terminal 34 is coupled to a gate of the first TMOS and to a gate of the second TMOS. The first active load (M4 14) is coupled to a drain of the first TMOS via first node 31. The second active load (M5 15) is coupled to a drain of the second TMOS via second node. The instrumental amplifier (IA) 37 has an IA inverting input (-), an IA non-inverting input (+), an IA output and an IA average voltage port ("Average"). The IA inverting input is coupled to the drain of the first TMOS. The IA non-inverting input is coupled to the drain of the second TMOS. The common mode feedback amplifier (CMFA) 34 includes a CMFA inverting input (−), a CMFA non-inverting input (+) and a CMFA output. The CMFA inverting input may be fed by a reference voltage VREF 33. The CMFA non-inverting input is coupled to the IA average voltage port.

The first capacitor C1 is coupled between R1 and the intermediate node 29. The second capacitor C2 is coupled between R2 and the intermediate node 29 and R1 and R2 respectively. The first resistor R1 is coupled between C1 and the drain of the first TMOS. The second resistor R2 is coupled between C2 and the drain of the second TMOS.

The drain of M4 is coupled to the drain of the first TMOS.

The drain of M5 is coupled to the drain of the second TMOS.

The gate of the M4 is coupled to a gate of the M5—for example via R3 27 and R4 28. second MOSFET transistor. R3 is coupled between the gate of M4 and intermediate node 29. R4 is coupled between the gate of M5 and intermediate node 29. R3 and R4 may be adjustable resistors.

The suggested detection circuit exhibits the following advantages:

a. Differential measurement.
b. CMFb, which is closed through the Instrumentation Amplifier (no need for additional amplifiers).
c. Floating "source" node of the sensors.
d. Simplicity.

The TMOS may be operated in sub-threshold—thereby reducing power consumption, reducing self-heating and increase the signal to noise ratio. The operation of the TMOS in voltage mode activates an additional internal gain of transistors, resulting in significantly higher signal on the one hand, but causing the operation point to be unstable from the other hand. That is why the operation point of the detection circuit has to be stabilized by using the common mode feedback.

However, the voltage readout at subthreshold leads to even higher temperature sensitivity as well as higher responsivity.

Figure 2:
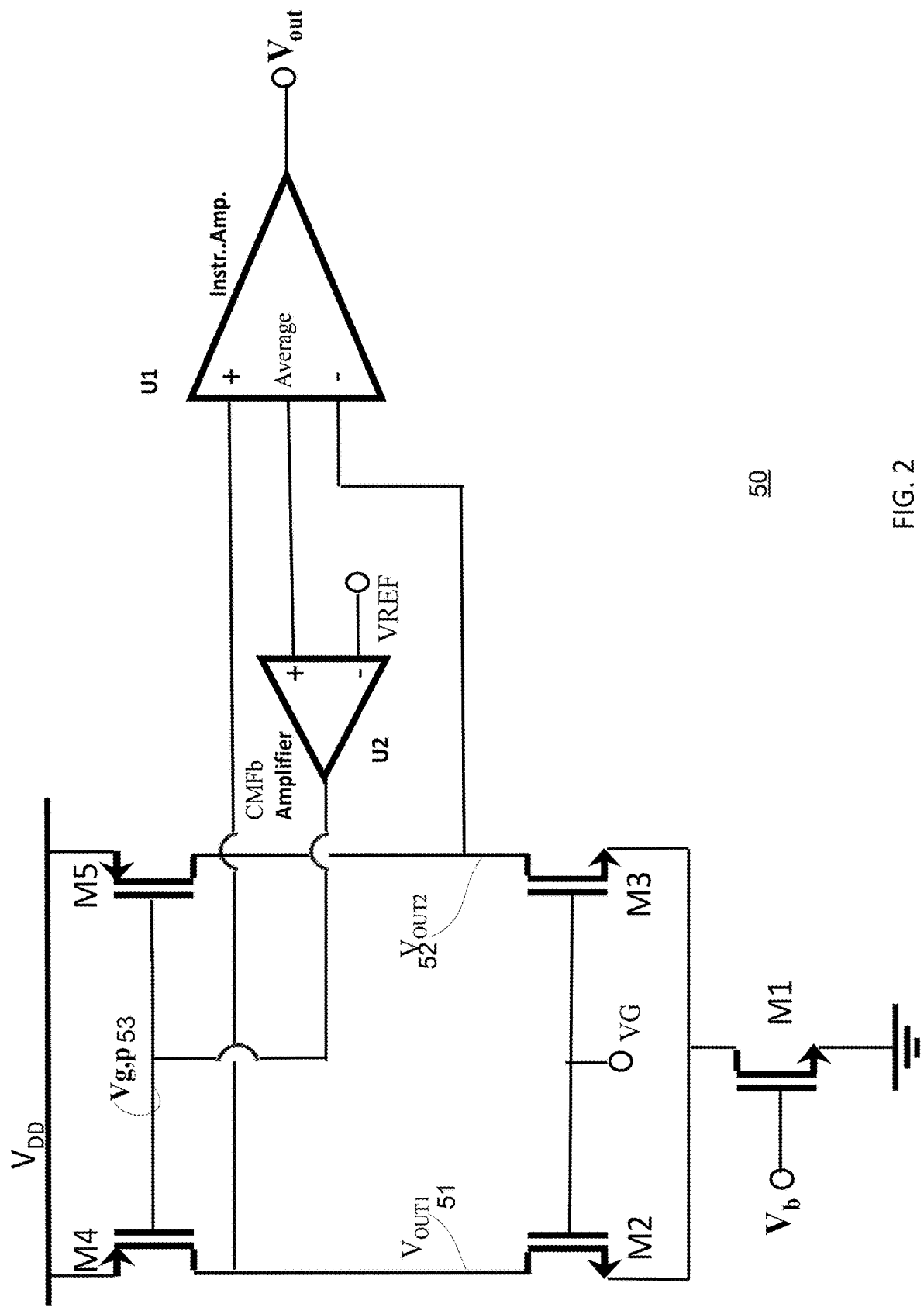
FIG. 2 illustrate the simplified schematic of the detection circuit of FIG. 1.

FIG. 2 illustrate an example of a simplified schematic 50 of the detection circuit of FIG. 1.

The following will show that the average voltage between voltages $V_{OUT1}$ 51 and $V_{OUT2}$ 52 is defined by voltage "$V_{REF}$", applied at the negative input of CMFb Amplifier (U2).

Figure 3:
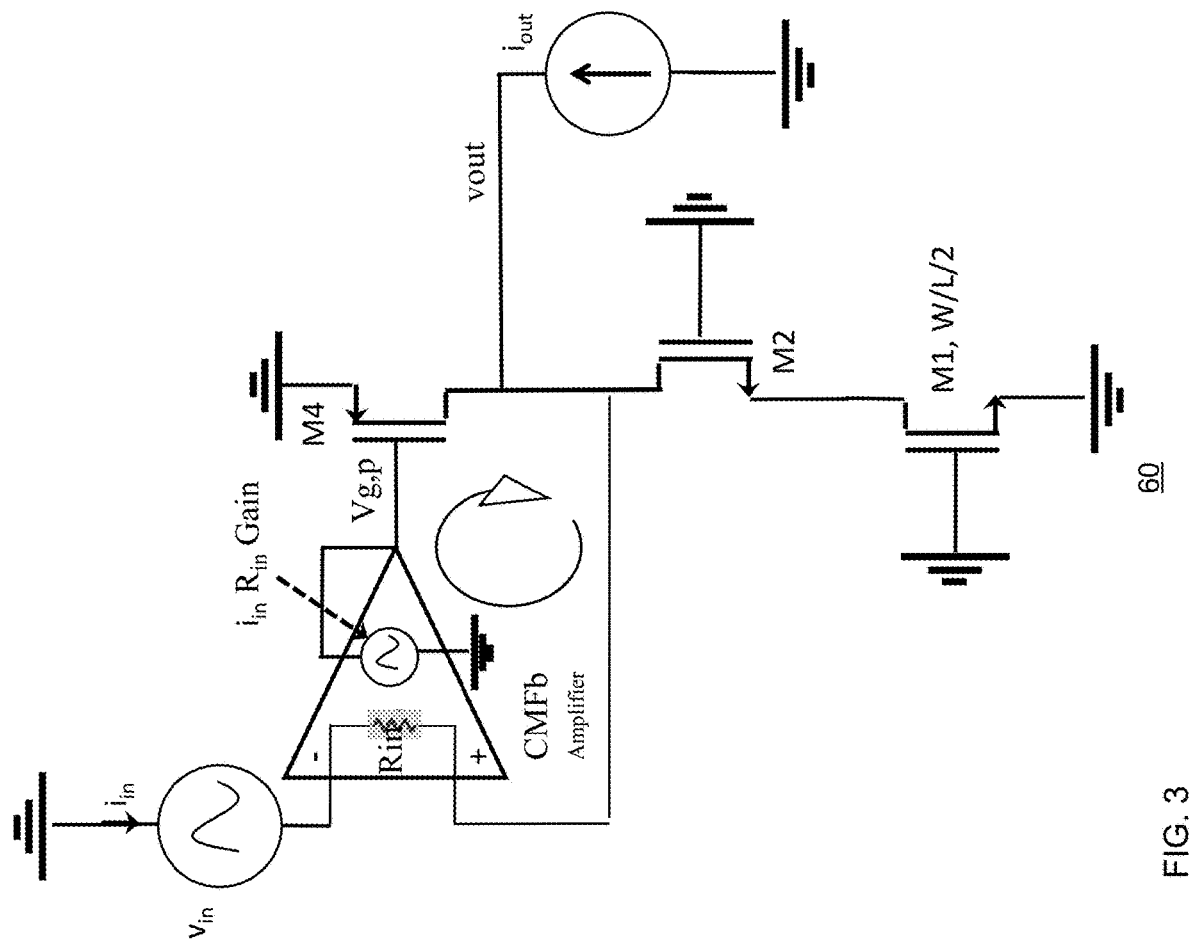
FIG. 3 illustrates the small-signal analysis of common mode feedback of the detection circuit of FIG. 2.

Referring to FIG. 3 which is another model 60 of the detection circuit—because the voltages are common-mode voltages, then the analysis may divide the detection circuit into two identical halves FIG. 3 provides a transition to small-signal circuit and uses the following: $V_{in}$—constraint input, $i_{in}$—input response, $V_{out}$—output response, $i_{out}$—constraint output, and Gain—the gain of CMFb amplifier.

Figure 4:
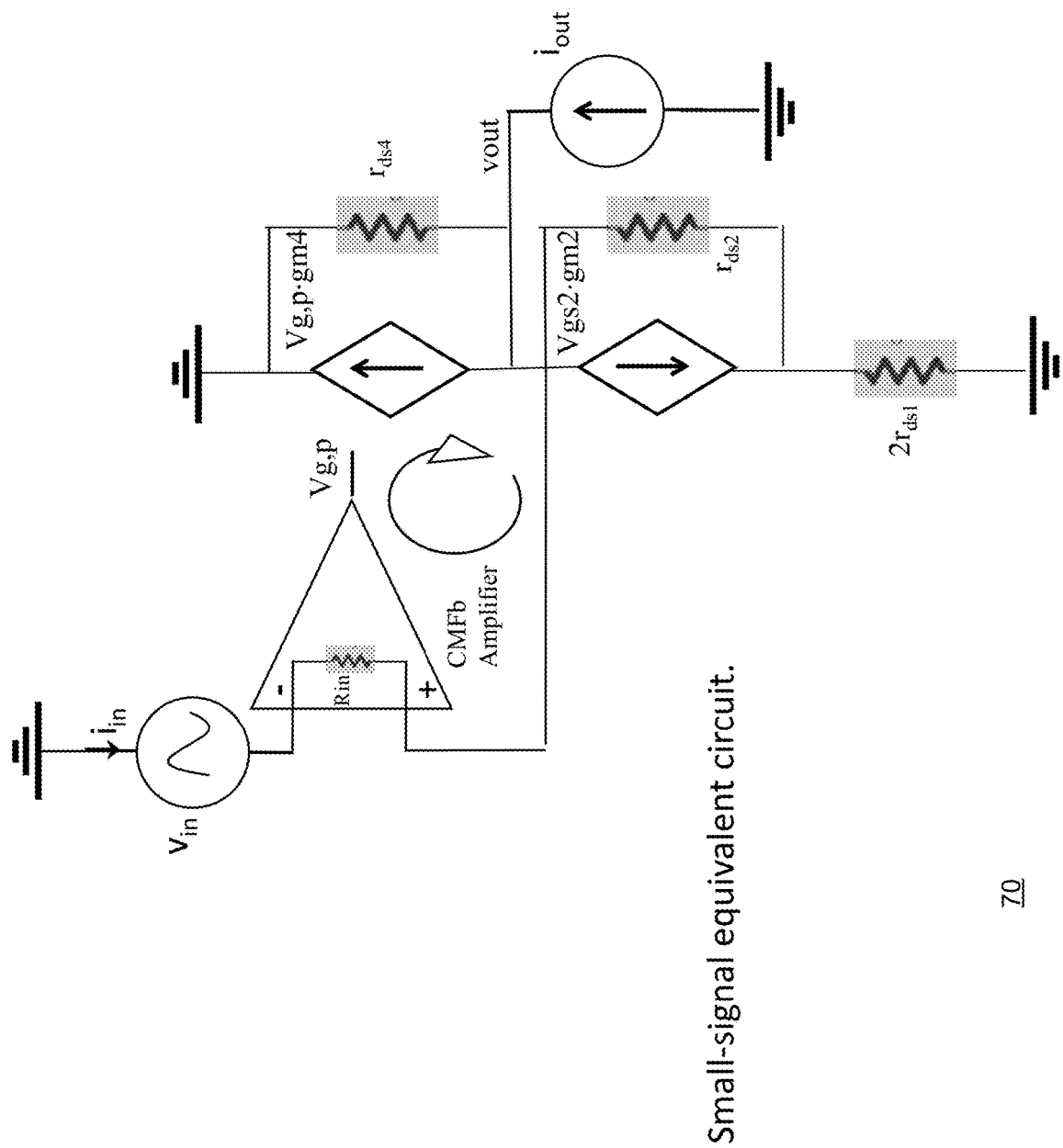
FIG. 4 illustrate the operation of the detection circuit of FIG. 1.

FIG. 4 is an example of a small signal circuit 70, in which the transistors are represented by their small-signal models.

See, also the following equations:

Kirchoff's equations:

$$\begin{pmatrix} v_{in} \\ i_{out} \end{pmatrix} = \begin{pmatrix} I_{11} & B \\ A & I_{22} \end{pmatrix} \cdot \begin{pmatrix} i_{in} \\ v_{out} \end{pmatrix}$$

$$I_{11} = \frac{v_{in}}{i_{in}} \bigg|_{v_{out}=0} = R_{in}$$

$$I_{22} = \frac{i_{out}}{V_{out}} \bigg|_{i_{in}=0} \cong g_{ds4} + \frac{1}{r_{ds1} \cdot (g_{m2} \cdot r_{ds2})} = g_{ds4} + \frac{g_{ds1}}{\left(\frac{q}{nkT\lambda}\right)} \cong g_{ds4}$$

$$B = \frac{v_{in}}{v_{out}} \bigg|_{i_{in}=0} = 1$$

$$A = \frac{i_{out}}{i_{in}} \bigg|_{v_{out}=0} = \frac{i_{in} \cdot R_{in} \cdot \text{Gain} \cdot g_{m,p} - i_{in}}{i_{in}} = R_{in} \cdot \text{Gain} \cdot g_{m,p} - 1, (\text{Gain} < 0)$$

$$LT = \frac{AB}{I_{11} I_{22}} = \frac{(R_{in} \cdot \text{Gain} \cdot g_{m,p} - 1) \cdot 1}{R_{in} \cdot g_{ds4}} \cong \frac{g_{m,p} \cdot \text{Gain}}{g_{ds4}}$$

$$H_f = \frac{1}{B} \cdot \frac{-LT}{1 - LT} = \frac{-\frac{g_{m,p} \cdot \text{Gain}}{g_{ds4}}}{1 - \frac{g_{m,p} \cdot \text{Gain}}{g_{ds4}}} \to 1, (\text{Gain} < 0)$$

Taking into consideration that:

$$\frac{g_{m,p} \cdot |\text{Gain}|}{g_{ds4}} \gg 1$$

we can get:

$$V_{error\_signal} \equiv v_{in} - v_{out} = \frac{v_{in}}{1 - LT} \to 0$$

The last equation proves that "$v_{error\_signal}$" is close to zero, i.e. "$v_{out}$" (the average DC voltage between voltages $V_{OUT1}$ and $V_{OUT2}$) is almost equal to voltage "$v_{in}$", applied at the negative input of CMFb Amplifier (U2).

Figure 5:
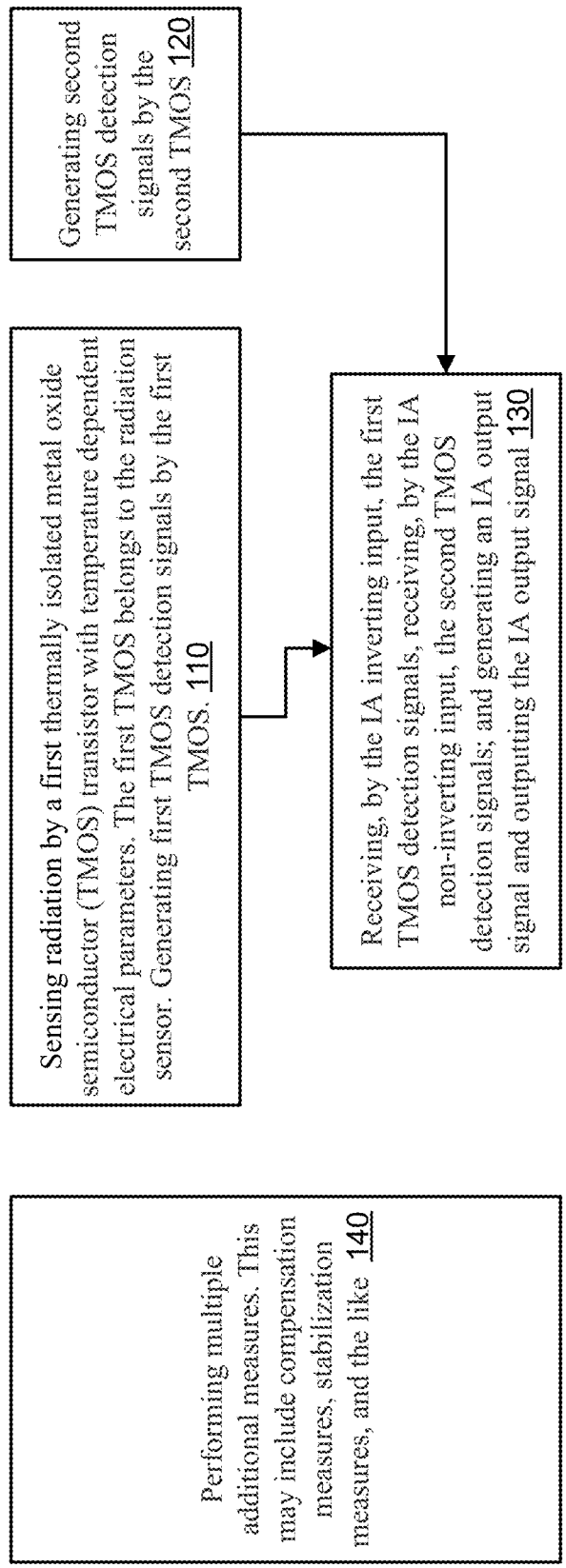
FIG. 5 is an example of a method.

FIG. 5 illustrates an example of a method 100 for operating a radiation sensor.

Method 100 may include steps 110, 120 and 130.

Step 110 may include sensing radiation by a first thermally isolated metal oxide semiconductor (TMOS) transistor with temperature dependent electrical parameters. The first TMOS belongs to the radiation sensor. The radiation sensor also includes a second TMOS transistor that is sheltered from radiation; a current source that is coupled to a source of the first TMOS and to a source of the second TMOS; a voltage gate terminal that is coupled to a gate of the first TMOS and to a gate of the second TMOS; two right-half-plane (RHP) zero cancelling branches coupled to the intermediate node; a first active load that is coupled to a drain of the first TMOS; a second active load that is coupled to a drain of the second TMOS; an instrumental amplifier (IA) having an IA inverting input, an IA non-inverting input, an IA output and an IA average voltage port; wherein the IA inverting input is coupled to the drain of the first TMOS; wherein the IA non-inverting input is coupled to the drain of the second TMOS; and a common mode feedback amplifier (CMFA) comprising a CMFA inverting input, a CMFA non-inverting input and a CMFA output; wherein the CMFA inverting input is fed by a reference voltage; wherein the CMFA non-inverting input is coupled to the IA average voltage port.

Step 110 may also include generating first TMOS detection signals by the first TMOS.

Step 120 may include generating second TMOS detection signals by the second TMOS.

Steps 110 and 120 may be followed by step 130 of receiving, by the IA inverting input, the first TMOS detection signals, receiving, by the IA non-inverting input, the second TMOS detection signals; and generating an IA output signal and outputting the IA output signal.

Method 100 may also include step 140 of performing multiple additional measures. This may include compensation measures, stabilization measures, and the like.

Step 140 may be executed in parallel to steps 110, 120 and 130.

Step 140 may include at least one out of performing RHP zero cancelling by the two right-half-plane zero cancelling branches: performing one out of supplying current and draining current by the current source; feeding the CMFA inverting input is fed by a reference voltage; actively loading the first TMOS by the first active load; and actively loading the second TMOS by the second active load.

Any reference to any of the terms "comprise", "comprises", "comprising" "including", "may include" and "includes" may be applied to any of the terms "consists", "consisting", "consisting essentially of".

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "rear" "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between various components are merely illustrative and that alternative embodiments may merge various components or impose an alternate decomposition of functionality upon various components. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" Each other such that the desired functionality is achieved, irrespective of architectures or intermedial components. Likewise, any two components so associated can also be viewed as being "operably connected," or "operably coupled," to Each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A radiation sensing device, comprising:
a first thermally isolated metal oxide semiconductor (TMOS) transistor with temperature dependent electrical parameters; wherein the first TMOS is exposed to radiation;
a second TMOS transistor that is sheltered from radiation;
a current source that is coupled to a source of the first TMOS and to a source of the second TMOS;
a voltage gate terminal that is coupled to a gate of the first TMOS and to a gate of the second TMOS;
two right-half-plane (RHP) zero cancelling branches coupled to the intermediate node;
a first active load that is coupled to a drain of the first TMOS;
a second active load that is coupled to a drain of the second TMOS;
an instrumental amplifier (IA) having an IA inverting input, an IA non-inverting input, an IA output and an IA average voltage port; wherein the IA inverting input is coupled to the drain of the first TMOS; wherein the IA non-inverting input is coupled to the drain of the second TMOS; and a common mode feedback amplifier (CMFA) comprising a CMFA inverting input, a CMFA non-inverting input and a CMFA output; wherein the CMFA inverting input is fed by a reference voltage; wherein the CMFA non-inverting input is coupled to the IA average voltage port.

2. The radiation sensing device according to claim 1 wherein the two RHP zero cancelling branches comprise a first branch that comprises a first resistor and a first capacitor that are serially connected to each other; wherein the first capacitor is also coupled to the intermediate node; wherein the first resistor is also coupled to the drain of the second TMOS.

3. The radiation sensing device according to claim 2 wherein the two RHP zero cancelling branches comprise a second branch that comprises a second resistor and a second capacitor that are serially connected to each other; wherein the second capacitor is also coupled to the intermediate node; wherein the second resistor is also coupled to the drain of the second TMOS.

4. The radiation sensing device according to claim 1 wherein the first load is a first metal-oxide-semiconductor field-effect transistor (MOSFET) transistor that has a drain that is coupled to the drain of the first TMOS.

5. The radiation sensing device according to claim 4 wherein the second load is a second MOSFET transistor that has a drain that is coupled to the drain of the second TMOS; and
wherein a gate of the first MOSFET transistor is coupled to a gate of the second MOSFET transistor.

6. The radiation sensing device according to claim 4 wherein the second load is a second MOSFET transistor that has a drain that is coupled to the drain of the second TMOS; wherein a gate of the first MOSFET transistor is coupled to the intermediate node via a first adjustable resistor.

7. The radiation sensing device according to claim 6 wherein a gate of the first MOSFET transistor is coupled to the intermediate node via a second adjustable resistor.

8. The radiation sensing device according to claim 1 wherein first TMOS and the second TMOS and floating.

9. The radiation sensing device according to claim 1 wherein the current source is a current mirror.

10. The radiation sensing device according to claim 1 wherein the first TMOS and the second TMOS are configured to operate at a sub-threshold during a sensing period.

11. A method for sensing radiation by a radiation sensor, the method comprises:
sensing radiation by a first thermally isolated metal oxide semiconductor (TMOS) transistor with temperature dependent electrical parameters; wherein the first TMOS belongs to the radiation sensor; wherein the radiation sensor also includes a second TMOS transistor that is sheltered from radiation; a current source that is coupled to a source of the first TMOS and to a source of the second TMOS; a voltage gate terminal that is coupled to a gate of the first TMOS and to a gate of the second TMOS; two right-half-plane (RHP) zero cancelling branches coupled to the intermediate node; a first active load that is coupled to a drain of the first TMOS; a second active load that is coupled to a drain of the second TMOS; an instrumental amplifier (IA) having an IA inverting input, an IA non-inverting input, an IA output and an IA average voltage port;

wherein the IA inverting input is coupled to the drain of the first TMOS; wherein the IA non-inverting input is coupled to the drain of the second TMOS; and a common mode feedback amplifier (CMFA) comprising a CMFA inverting input, a CMFA non-inverting input and a CMFA output; wherein the CMFA inverting input is fed by a reference voltage; wherein the CMFA non-inverting input is coupled to the IA average voltage port;
generating first TMOS detection signals by the first TMOS;
generating second TMOS detection signals by the second TMOS;
receiving, by the IA inverting input, the first TMOS detection signals;
receiving, by the IA non-inverting input, the second TMOS detection signals; and
generating an IA output signal and outputting the IA output signal; and
wherein the method further comprises:
performing RHP zero cancelling by the two right-half-plane zero cancelling branches:
performing one out of supplying current and draining current by the current source;
feeding the CMFA inverting input is fed by a reference voltage;
actively loading the first TMOS by the first active load; and
actively loading the second TMOS by the second active load.

12. The method according to claim 11 wherein the two RHP zero cancelling branches comprise a first branch that comprises a first resistor and a first capacitor that are serially connected to each other; wherein the first capacitor is also coupled to the intermediate node;
wherein the first resistor is also coupled to the drain of the second TMOS.

13. The radiation sensing device according to claim 2 wherein the two RHP zero cancelling branches comprise a second branch that comprises a second resistor and a second capacitor that are serially connected to each other; wherein the second capacitor is also coupled to the intermediate node; wherein the second resistor is also coupled to the drain of the second TMOS.

14. The method according to claim 11 wherein the first load is a first metal-oxide-semiconductor field-effect transistor (MOSFET) transistor that has a drain that is coupled to the drain of the first TMOS.

15. The radiation sensing device according to claim 4 wherein the second load is a second MOSFET transistor that has a drain that is coupled to the drain of the second TMOS; and
wherein a gate of the first MOSFET transistor is coupled to a gate of the second MOSFET transistor.

16. The radiation sensing device according to claim 4 wherein the second load is a second MOSFET transistor that has a drain that is coupled to the drain of the second TMOS; wherein a gate of the first MOSFET transistor is coupled to the intermediate node via a first adjustable resistor.

17. The radiation sensing device according to claim 6 wherein a gate of the first MOSFET transistor is coupled to the intermediate node via a second adjustable resistor.

18. The method according to claim 11 wherein first TMOS and the second TMOS and floating.

19. The method according to claim 11 wherein the current source is a current mirror.

20. The method according to claim 11 wherein the first TMOS and the second TMOS are configured to operate at a sub-threshold during a sensing period.

* * * * *